April 18, 1939.  E. E. HEWITT  2,155,227
RETARDATION CONTROL BRAKE
Filed May 14, 1937  3 Sheets-Sheet 1
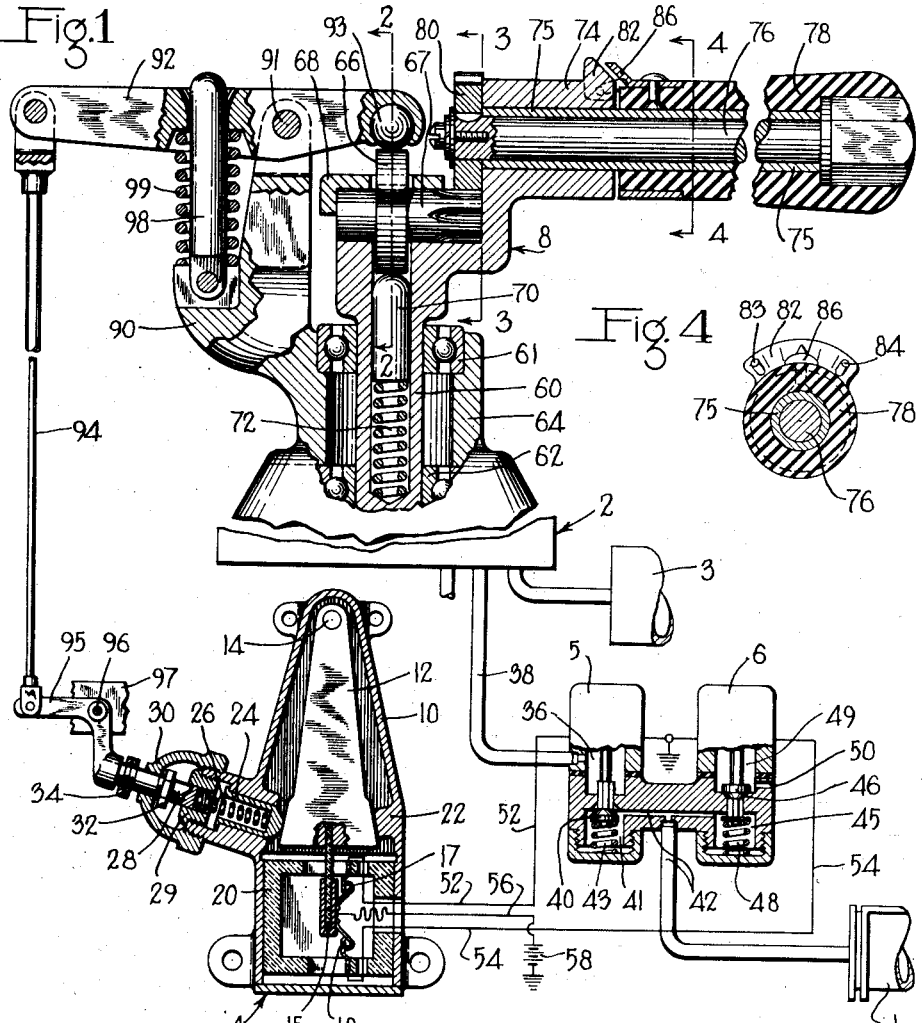
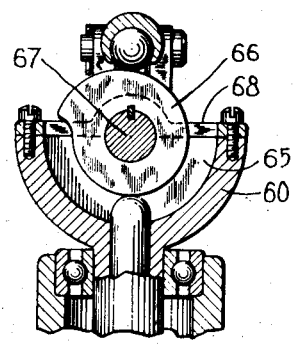
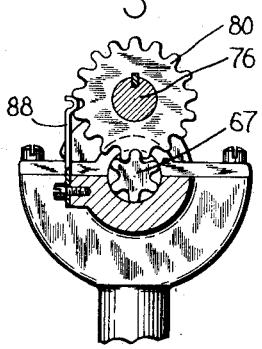
INVENTOR
ELLIS E. HEWITT
BY *Wm. M. Cady*
ATTORNEY April 18, 1939. E. E. HEWITT 2,155,227
RETARDATION CONTROL BRAKE
Filed May 14, 1937    3 Sheets-Sheet 2
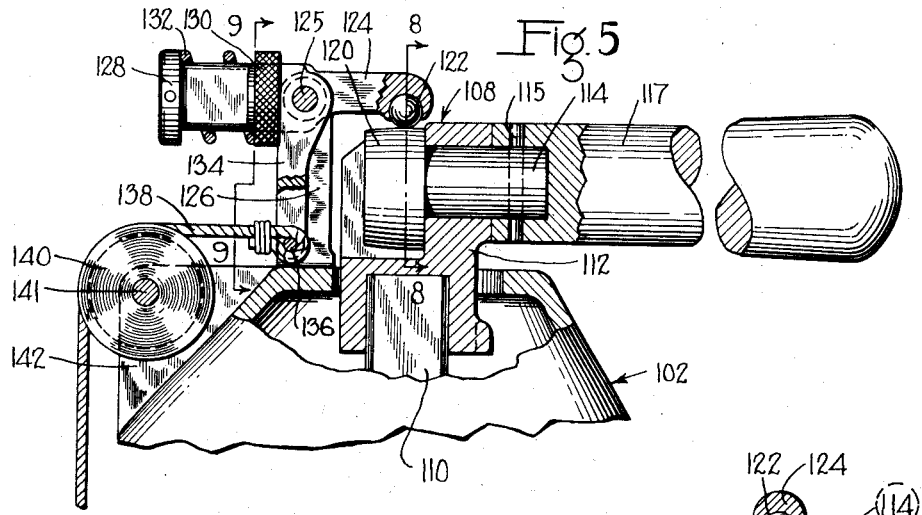
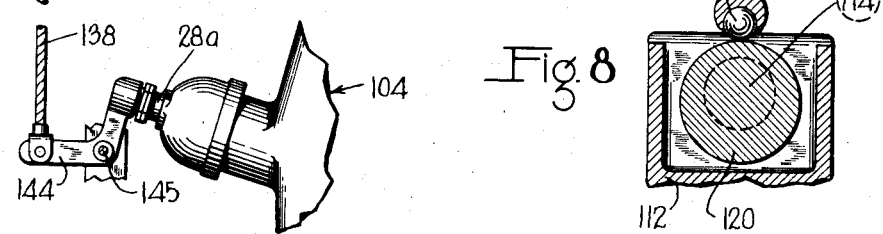
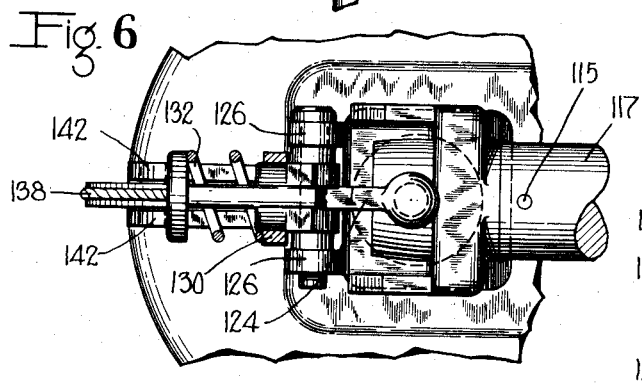
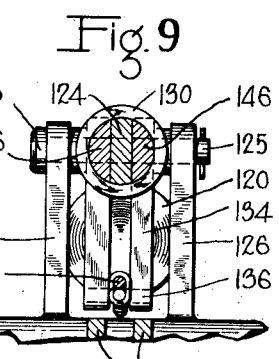
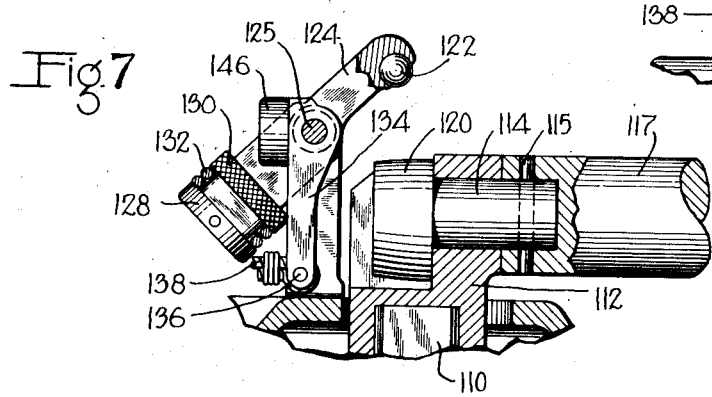
INVENTOR
ELLIS E. HEWITT
BY *John M. Cady*
ATTORNEY April 18, 1939.  E. E. HEWITT  2,155,227
RETARDATION CONTROL BRAKE
Filed May 14, 1937  3 Sheets-Sheet 3
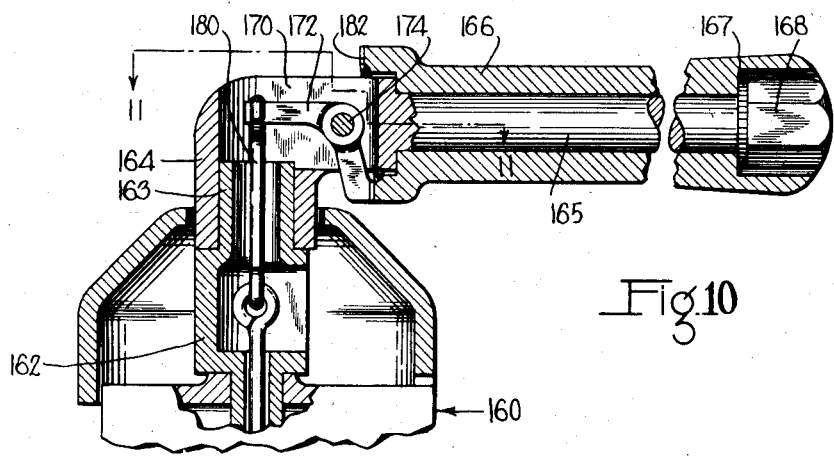
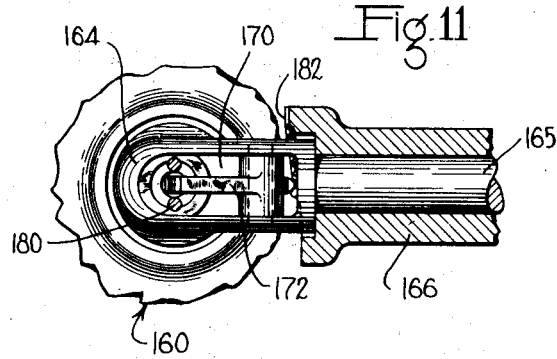
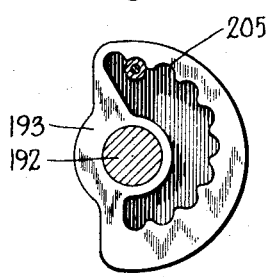
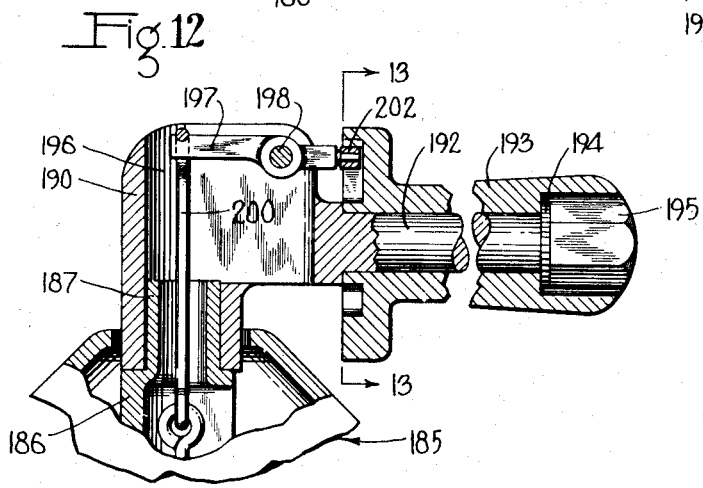
INVENTOR
ELLIS E. HEWITT
BY
ATTORNEY Patented Apr. 18, 1939

2,155,227

UNITED STATES PATENT OFFICE 2,155,227

RETARDATION CONTROL BRAKE

Ellis E. Hewitt, Edgewood, Pa., assignor to The Westinghouse Air Brake Company, Wilmerding, Pa., a corporation of Pennsylvania Application May 14, 1937, Serial No. 142,541

8 Claims. (Cl. 303—24)

This invention relates to a vehicle brake equipment and more particularly to improved means for controlling both applications of the vehicle braking means, and a control device responsive to an operating condition of the vehicle, such as the rate of retardation of the vehicle, for controlling the degree of application of the braking means.

It has heretofore been proposed to provide a vehicle brake equipment incorporating means responsive to the rate of retardation of the vehicle for limiting the degree of application of the vehicle brake means to a value effective to produce a predetermined rate of retardation of the vehicle, this means including manually operated adjusting means by which the rate of retardation produced may be adjustably varied. This brake equipment also included other manually operated means for effecting applications of the brakes.

It is an object of this invention to provide a control device incorporating a single member which is operable to independently control applications of the brakes, and to also control adjustment of the retardation control means.

A further object of the invention is to provide an improved vehicle brake apparatus having a control member for controlling an application device for effecting applications of the brakes, and for also controlling a retardation control device, the control member being adapted to permit control of either said devices without affecting the other of the said devices.

Another object of the invention is to provide a vehicle brake equipment of the type described and incorporating a control member movable about two axes, means operated by movement of said control member about one of said axes for controlling applications of the vehicle braking means, and means operated by movement of said control member about the other of said axes for adjusting a retardation control device.

A further object of the invention is to provide a vehicle brake equipment of the type described having an application device for effecting applications of the brakes, and having a retardation control device for limiting the degree of application of the brakes by said application device, the brake equipment incorporating a control member movable about either of two axes, means operated by movement of the control member about one of said axes for controlling one of said devices, and other means operated by movement of said control member about the other of said axes for controlling the other of said devices, said other means being connected with the control member substantially at a point intersected by the first named axis, whereby said other device is substantially unaffected by movement of said member to control said first named device.

Another object of the invention is to provide a vehicle brake equipment incorporating a control member of the type described, the apparatus being arranged to permit easy removal and replacement of the control member.

A further object of the invention is to provide a vehicle brake equipment incorporating a control member of the type described, and having visual means for indicating the relative rotative position of said member with respect to one of the axes about which it is movable.

Another object of the invention is to provide a control device for use in a vehicle brake equipment, the control device having a member movable about an axis for effecting one kind of control of the vehicle braking apparatus, and having an element carried by said member for moving said member, said element being movable relative to said member for effecting a different kind of control of the braking apparatus.

A further object of the invention is to provide an improved control device adapted for use in a vehicle brake equipment.

Other objects of the invention and features of novelty will be apparent from the following description taken in connection with the accompanying drawings, in which Fig. 1 is a diagrammatic view, largely in section, of a brake equipment embodying this invention, Fig. 2 is a sectional view taken substantially along the line 2—2 of Fig. 1, Fig. 3 is a sectional view taken substantially along the line 3—3 of Fig. 1, Fig. 4 is a sectional view taken substantially along the line 4—4 of Fig. 1, Fig. 5 is a fragmentary view, partly in section, of a modified form of a control device embodying this invention, Fig. 6 is a top view of a portion of the control device shown in Fig. 5, Fig. 7 is a fragmentary view, partly in section, of the control device shown in Fig. 5, and showing certain of the elements of the control device in somewhat different positions than that in which they are shown in Fig. 5, Fig. 8 is a sectional view taken substantially along the line 8—8 on Fig. 5, Fig. 9 is a sectional view taken substantially along the line 9—9 on Fig. 5, Fig. 10 is a fragmentary sectional view showing a different form of control device embodying this invention, Fig. 11 is a sectional view taken substantially along the line 11—11 on Fig. 10, Fig. 12 is a fragmentary sectional view showing a still different form of control device embodying this invention, and Fig. 13 is a sectional view taken substantially along the line 13—13 on Fig. 12.

Referring to Fig. 1 of the drawings, the vehicle brake equipment shown therein includes braking means in the form of a brake cylinder 1 which is operated on an increase in the pressure of the fluid supplied thereto to effect an application of the brakes on the vehicle. This equipment also includes an application device, indicated generally by the reference numeral 2, for supplying fluid under pressure from a reservoir 3 to a passage through which fluid may be supplied to the brake cylinder 1, while the application device 2 is also operable to release fluid under pressure from this passage.

The application device 2 may be of any suitable well known construction, such as a rotary valve mounted in a chamber and movable upon a seat having a port therein to which is connected a pipe leading to the brake cylinder 1, or it may comprise a self-lapping valve of the type shown in U. S. Patent No. 2,042,112, issued May 26, 1936, to Ewing K. Lynn and R. J. Bush, which operates to supply fluid under pressure at pressures which vary in accordance with the position in an operating range to which an operating member is moved.

The brake equipment shown in Fig. 1 of the drawings includes a retardation control device 4 which controls the supply of current to the windings of application and release magnet valve devices 5 and 6 for limiting the degree of application of the braking means by the application means, while there is a control device, indicated generally by the reference numeral 8, for controlling the application means 2, and for also controlling the adjustment of the retardation control device 4.

The retardation control device 4 comprises a housing or casing 10 providing a chamber in which is mounted an inertia responsive body in the form of a pendulum 12 suspended from a pin 14 carried by the casing 10 of the control device.

The casing 10 of the retardation control device 4 is provided with brackets by means of which it may be secured on the body of the vehicle. The device is secured on the vehicle so that the pendulum 12 is movable in the plane in which the vehicle moves.

The pendulum 12 has secured thereto, but insulated therefrom, a movable contact 15 which is adapted to engage, at certain times as will hereinafter more fully appear, stationary contacts 17 and 18 which are supported on an insulating member 20 mounted within the casing 10 of the retardation control device 4.

The casing 10 of the retardation control device 4 has a lug or projection 22 formed thereon and extending into the chamber within the casing. This lug is adapted to be engaged by one face of the pendulum 12 to limit movement of the pendulum in one direction, while the other face of the pendulum is engaged by a plunger 24 mounted in a bore in a boss formed integral with the casing 10. A spring 26 extends between the plunger 24 and a plunger 28 which is reciprocable in aligned bores in a guide member 29, and in a casing cover section 30. The plunger 28 has secured thereon a nut 32 which is adapted to engage the inner face of the cover section 30 to limit movement of the plunger by the spring 26, while the plunger 28 has secured thereon at a point outside the casing 30, a pair of lock nuts 34 which are adapted to engage the outer face of the cover section 30 to limit movement of the plunger 28 against the spring 26.

The retardation control device 4 is mounted on the vehicle in such a manner that on a reduction in the speed of the vehicle, the pendulum 12 is moved against the spring pressed plunger 24. The amount of movement of the pendulum against the plunger 24 in response to a given rate of retardation of the vehicle, or the rate of retardation of the vehicle necessary to produce a predetermined movement of the pendulum against the spring pressed plunger 24, is dependent upon the adjustment of the spring 26.

The application magnet valve device 5 comprises a body having chamber 36 therein which is connected by way of a pipe 38 with the application device 2.

A valve 40 controls communication between the chamber 36 and a chamber 41, which is constantly connected by way of a passage and pipe 42 with the brake cylinder 1. A coil spring 43 is mounted in the chamber 41 and yieldingly urges the valve 40 to the seated position. On energization of the winding of the magnet valve device 5 the valve 40 is moved against the spring 41 to the open position to permit the supply of fluid under pressure from the chamber 36 to the chamber 41, and thence by way of the passage and pipe 42 to the brake cylinder 1.

The release magnet valve device 6 comprises a casing having a chamber 45 therein which is constantly connected with the brake cylinder 1 by means of a branch of the passage 42, while a valve 46 is provided and is yieldingly urged by means of a spring 48 to the open position to permit the supply of fluid under pressure from the chamber 45 to a chamber 49 which is constantly open to the atmosphere through a passage 50.

One terminal of the winding of each of the magnet valve devices 5 and 6 is connected to ground, while the other terminal of the winding of the application magnet valve device 5 is connected by way of a wire 52 to the stationary contact 17. The other terminal of the winding of the release magnet valve device 6 is connected by way of a wire 54 with the stationary contact 18, while the movable contact 15 associated with the pendulum 12 is connected by way of a wire 56 to one terminal of a suitable source of electric current, such as a battery 58, the other terminal of which is connected to ground.

The stationary contacts 17 and 18 are arranged so that on a predetermined movement of the pendulum 12 away from the projection 22 against the spring pressed plunger 24, the movable contact 15 is moved out of engagement with the stationary contact 17, to which is connected one terminal of the winding of the application magnet valve device 5, while the movable contact 15 remains in engagement with the stationary contact 18, to which is connected one terminal of the winding of the release magnet valve device 6. As a result, the winding of the application of the magnet valve device 5 will be deenergized, and the valve 40 thereof is moved to the seated position by the spring 41 to cut off the supply of fluid under pressure from the chamber 36 to the chamber 41, and thence to the passage and pipe 42 leading to the brake cylinder 1.

In addition, at this time the winding of the release magnet valve device 6 will be maintained energized and the valve 46 is maintained in the seated position to prevent the escape of fluid under pressure from the brake cylinder 1.

The various parts of the retardation control device 4 are also arranged so that on a further predetermined movement of the pendulum 12 away from the projection 22 against the spring pressed plunger 24, the movable contact 15 is moved out of engagement with the stationary contact 18 as well as out of engagement with the stationary contact 17, and on this movement of the movable contact 15, the supply of current to the winding of the release magnet valve device 6 is cut off, thereby permitting the spring 48 to move the valve 46 to the open position to release fluid under pressure from the brake cylinder 1, and thus reduce the degree of application of the brakes on the vehicle.

As a result of this reduction in the pressure of the fluid in the brake cylinder 1 there will be a reduction in the rate of retardation of the vehicle, and the pendulum 12 will be moved relative to the casing 10 by the spring pressed plunger 24 until the movable contact 15 engages the stationary contact 18 to complete the circuit to the winding to the release magnet valve device 6, and upon energization of this winding the valve 46 is moved to the seated position to cut off the release of fluid under pressure of the brake cylinder 1.

If there is a further reduction in the rate of retardation of the vehicle, the pendulum 12 will be moved farther by the spring pressed plunger 24 so that the movable contact 15 engages the stationary contact 17, thereby completing the circuit through the winding of the application magnet valve device 5, whereupon the valve 40 will be moved to the open position to permit the resupply of fluid under pressure to the brake cylinder 1, with the result that the retardation control device 4 will operate to permit a substantially constant, predetermined rate of retardation of the vehicle, this rate being dependent upon the adjustment of the spring pressed plunger 24.

The brake equipment provided by this invention incorporates a control device, indicated generally by the reference numeral 8, which has a single member arranged to control the application device 2, and to also control the adjustment of the spring 26 associated with the retardation control device 4 to thereby vary the rate of retardation which this device is effective to permit.

In the construction shown in Figs. 1 to 4 of the drawings, the control device 8 comprises a member 60 which is rotatably supported by means of anti-friction bearings 61 and 62 on a body 64 associated with the application device 2. The member 60 has a shaft portion which extends through the anti-friction bearings 61 and 62, and has mounted on the lower end thereof suitable means, not shown, for actuating the application device 2.

As is best shown in Fig. 2 of the drawings the upper end of the member 60 has a semi-circular recess 65 formed therein in which is mounted a cam member 66 which is mounted on a shaft 67 which is clamped between and rotatably supported in bearings formed in the member 60 and a clamp member 68.

The shaft portion of the member 60 has a bore therein in which is mounted a plunger 70 having a rounded end adapted to engage a face of the cam 66, while a coil spring 72 extends between the plunger 70 and the end of the bore in the member 60 and yieldingly presses the plunger 70 against the face of the cam member 66.

The member 60 has a portion 74 formed integral therewith and in which is secured a sleeve or tube 75. The axis of the sleeve 75 extends substantially perpendicular to the axis about which the member 60 moves, while the axes of the sleeve 75 and of the member 60 substantially intersect.

A shaft 76 is mounted within the sleeve 75, while a handle element 78 adapted to be gripped by the hand of an operator is rotatably supported on the outer surface of the sleeve or tube 75, and is secured by suitable means to one end of the shaft 76. The other end of the shaft 76 has secured thereon a gear 80 having teeth adapted to intermesh with teeth formed in the end of the shaft 67 on which is mounted the cam element 66. When the handle element 78 is turned the shaft 76 is turned, and the gear 80 turns the shaft 67, thereby causing the cam element 66 to be turned. On this movement of the cam element 66 the plunger 70 is moved against the spring 72, providing a varying resistance to turning movement of the cam element 66 to thereby indicate to the operator the relative position which the cam element 66 occupies.

The portion 74 of the member 60 has formed thereon a quadrant indicated at 82 and extending throughout a portion of a segment of a circle, as is best shown in Fig. 4 of the drawings. Pins 83 and 84 are secured in the portion 74 at points adjacent the ends of the quadrant 82, while the handle element 78 has associated therewith a pointer 86 adapted to move across the surface of the quadrant 82, and also adapted to engage the pins 83 and 84 to limit movement of the handle element 78. The pointer 86 provides a visual indication of the relative position which the handle element 78 occupies.

A spring 88 is secured to the portion 74 of the member 60 and is provided with a curved end portion adapted to extend into the spaces between the teeth of the gear 80 to yieldingly resist movement of the gear.

The body 64 has formed integral therewith an arm 90 on which is supported by means of a pin 91, a lever 92, one end of which has formed therein a socket in which is mounted a ball 93, which is adapted to engage the cam surface on the cam element 66 substantially at a point intersected by the axis of the shaft portion of the member 60.

The other end of the lever 92 is connected by way of a link 94 with one arm of a bell crank 95 which is supported by means of a pin 96 on a portion 97 of the vehicle structure. The other arm of the bell crank 95 has a socket therein adapted to receive the end of the plunger 28 of the retardation control device 4.

The arm 90 of the body 64 has pivotally secured thereto a rod 98 which extends through an opening in the lever 92 and upon which is mounted a coil spring 99, which extends between the lever 92 and a portion of the arm 90, and yieldingly presses the lever 92 about the pin 91 so that the ball 93 is held against the surface of the cam element 66.

As will be understood when the cam element 66 is rotated, the lever 92 is either moved against the spring 99, or is moved by the spring 99 about the pin 91, while this movement of the lever 92 is transmitted through the link 94 to the bell crank 95, and thence to the plunger 28 to move it against the spring 26, or permit the plunger to be moved by the spring 26, and thus vary the force exerted by the spring 26 through the plunger 24 upon the pendulum 12. The degree of force exerted by the spring 26, therefore, is varied in accordance with the position of the cam element 66.

In the operation of this brake equipment, assuming that the brakes are released and that the vehicle is in motion, but is not decelerating, the pendulum 12 will be maintained in engagement with the stop or projection 22, while the movable contact 15 will engage both of the stationary contacts 17 and 18, thereby completing the circuits through the windings of the application and release magnet valve devices 5 and 6. As a result of the supply of current to the winding of the application magnet valve device 5, the valve 46 thereof is held against the spring 41 in the open position to establish communication between the chamber 36 and the chamber 41 to which is connected the brake cylinder 1. At this time, however, the handle element 78 is in a position to maintain the application device 2 in the release position, with the result that no fluid under pressure is supplied from the reservoir 3 to the pipe 38, and hence fluid under pressure will not be supplied to the brake cylinder 1.

On the supply of current to the winding of the release magnet valve device 6, the valve 46 thereof is moved to the seated position to cut off communication between the chamber 45 and the chamber 49, which is open to the atmosphere.

If at this time the operator desires to effect an application of the brakes, he moves the handle element 78 in a horizontal plane, thereby causing the member 60 to be moved about a vertical axis determined by the anti-friction bearings 61 and 62. On this movement of the member 60 the application device 2 is operated to close communication between the atmosphere and the pipe 38, and to supply fluid under pressure thereto from the reservoir 3. On the supply of fluid under pressure to the pipe 38, fluid flows to the chamber 36 and past the open valve 40 to the chamber 41, from which it flows by way of the passage and pipe 42 to the brake cylinder 1. On an increase in the pressure of the fluid in the brake cylinder 1 there will be a reduction in the rate of speed of the vehicle, and the pendulum 12 is moved by the resulting force of inertia against the spring pressed plunger 24.

If the degree of application of the brakes produced by operation of the application device 2 produces a rate of retardation of the vehicle exceeding a predetermined value, the pendulum 12 will be moved against the spring pressed plunger 24 far enough to cause the movable contact 15 to be moved out of engagement with either or both of the stationary contacts 17 and 18, thereby interrupting the circuits to the application or release magnet valve devices 5 and 6, thus causing the application magnet valve device 5 to cut off the supply of fluid under pressure to the brake cylinder, and causing the release magnet valve device 6 to release fluid under pressure from the brake cylinder to limit the rate of retardation of the vehicle to a predetermined value, as explained in detail above.

The rate of retardation which the retardation control device 4 is effective to produce is dependent upon the adjustment of the spring 26, which in turn is controlled by the position of the cam element 66.

The ball 93 engages the cam surface on the cam element 66 substantially at a point intersected by the axis about which the member 60 moves, with the result that when the member 60 is turned to effect operation of the application device 2 to produce an application of the brakes, no force will be exerted between the cam element 66 and the ball 93 to move the lever 92 about the pin 91, and the adjustment of the spring 26 associated with the retardation control device 4 will not be altered.

If the operator desires to vary the adjustment of the spring 26 associated with the retardation control device 4 to cause the retardation control device to operate to produce a different rate of retardation of the vehicle, he may do so at any time, even during an application of the brakes.

In order to vary the adjustment of the spring 26 the handle element 78 is turned about the tube 75. This movement of the handle element 78 is transmitted to the shaft 76 and causes the gear 80 to be turned, overcoming the resistance of the spring 88. On this movement of the gear 80 the shaft 67 is turned by force transmitted through the gear teeth formed in the shaft, while the cam element 66 is turned. On this movement of the cam element 66 the lever 92 is moved against the spring 99, or is moved by the spring 99, so that the ball 93 occupies a position determined by the surface of the cam element 66. This movement of the lever 92 is transmitted through the link 94 and the bell crank 95 to move the plunger 28 against the spring 26 to increase the degree of compression of this spring, or to permit the plunger 28 to be moved by the spring 26 to reduce the degree of compression of this spring.

On this variation in the adjustment of the spring 26 there is a corresponding change in the rate of retardation of the vehicle which the control device 4 is effective to produce. The range of adjustment of the spring 26 by the handle element 78 is determined by the pins 83 and 84 associated with the quadrant 82 on the portion 74 of the body 60 which limit movement of the handle element 78.

It will be seen that when the handle element 78 is moved relative to the body 60 to change the adjustment of the retardation control device 4, the position of the body 60 relative to the body 64 of the application device 2 is not altered. Accordingly control of the brake equipment by operation of the application device 2 will not be affected on movement of the handle 78 to vary the adjustment of the retardation control device 4.

As pointed out above, as the ball 93 engages the cam element 66 substantially at a point intersected by the axis about which the body 60 moves, the adjustment of the spring 26 associated with the retardation control device 4 will not be affected by movement of the body 60 about its axis to effect operation of the application device 2.

Accordingly, while the handle element 78 may be moved about one axis to effect one type of control of the brake equipment, and may be moved about a different axis to effect a different type of control of the brake equipment, movement of the handle element about either of these axes will not affect in any way the control of the brake equipment intended to be regulated by movement of the handle element about the other of these axes.

In addition, it will be seen the spring 88 provides means yieldingly opposing movement of the handle 78 about the tube 75, and thereby prevents unintended movement of this handle and also operates to maintain the handle in the position to which it has been adjusted. It will also be seen that the spring pressed plunger 70, which engages the surface of the cam element 66, provides a varying resistance to movement of the cam element 66 to thereby constantly inform the operator of the relative position which the handle element 78 occupies. The position of the handle element 78 may also be determined visually by observation of the relative position of the pointer 86 with respect to the quadrant 82.

In Figs. 5 to 9 of the drawings there is shown a modified form of control means embodying this invention. The brake equipment with which this control means is employed is similar to that shown in Fig. 1 of the drawings and includes an application device, indicated generally at 102, for supplying fluid under pressure to and for releasing fluid under pressure from a brake cylinder, not shown, while a retardation control device 104 controls the pressure of the fluid in the brake cylinder to limit the rate of retardation of the vehicle to a value dependent upon the adjustment of a spring associated with the pendulum or inertia responsive member of the retardation control device. The control means, which is indicated generally by the reference numeral 108, provides means to control both the application device 102 and the retardation control device 104.

As shown in the drawings the application device 102 is provided with a shaft 110 having a square end portion which is adapted to be detachably received by a socket in a member 112, which is adapted to extend through an opening in the upper wall of the casing associated with the application device 102.

The member 112 has a bore therein in which is rotatably mounted the shaft portion of a cam or eccentric element 114. The axis of the bore in which this shaft portion is mounted extends substantially perpendicular to the axis about which the shaft 110 moves, while these axes are arranged so as to substantially intersect.

One end of the shaft portion of the cam element 114 has secured thereon by means of a pin 115, a handle element 117 which is adapted to be grasped by the hand of an operator to effect movement of the shaft 110 about its axis.

The other end of the shaft of the cam element 114 has formed thereon an eccentric portion indicated 120, and adapted to be engaged by a ball element 122 carried by an end of a lever 124 which is pivotally supported by means of a pin 125 carried by brackets 126 formed integral with the cover section of the application device 102.

The other end of the lever 124 extends beyond the pin 125 a substantial distance and has secured thereon a spring seat 128, while this portion of the lever 124 has slidably mounted thereon a locking ring 130. A coil spring 132 extends between the spring seat 128 and the locking ring 130, and yieldingly urges the locking ring 130 to the right, as viewed in Figs. 5, 6 and 7 of the drawings.

The pin 125 has mounted thereon at each side of the lever 124 and inwardly of the brackets 126, downwardly extending levers 134, the lower ends of which are connected by means of a pin 136 to which is connected one end of a cable or wire 138. The cable 138 extends over a grooved pulley 140, which is rotatably supported on a pin 141 carried by brackets 142 formed integral with the cover section of the application device 102. The other end of the cable 138 is secured to one arm of a bell crank 144 which is supported by means of a pin 145 on a suitable part of the vehicle structure. The other arm of the bell crank 144 has a socket therein adapted to receive the end of the plunger 28a, which corresponds to the plunger 28 shown in Fig. 1 of the drawings.

Each of the levers 134 has an arm or portion 146, which extends along the side of the lever 124 and has a curved outer surface, as is best shown in Fig. 9 of the drawings, adapted to be received within the locking ring 130, while the locking ring 130 normally is yieldingly held by the spring 132 in the position in which it surrounds the portions 146 of the levers 134. When the locking ring 130 is in the position in which it is shown in Fig. 5 of the drawings, it secures the lever 124 to the levers 134 so that these levers operate as a unit, and on movement of the ball 122 by the eccentric 120 force is exerted through the levers 134, and thence upon the cable 138 to effect movement of the bell crank 144, and thereby vary the adjustment of the spring associated with the retardation control device 104.

In the operation of this equipment, in order to effect an application of the brakes by operation of the application device 102, the handle element 117 is moved in a horizontal plane, causing the shaft 110 to move about its axis, thereby conditioning the application device 102 to supply fluid under pressure to the brake cylinder, not shown, to produce an application of the brakes.

On this movement of the handle element 117 the eccentric portion 120 of the cam element 114 is turned beneath the ball 122, but as the ball 122 engages the eccentric portion 120 substantially at a point intersected by the axis about which the shaft 110 turns, no movement of the ball 122 will either be caused or permitted, and hence the adjustment of the retardation control device 104 will not be affected.

If it is desired to vary the adjustment of the retardation control device, it may be accomplished at any time without varying the adjustment of the application device 102. In order to vary the adjustment of the retardation control device 104, the handle element 117 is turned, thereby causing the cam element 114 to be turned and causing the eccentric portion 120 to be moved. On this movement of the eccentric portion 120, the end of the arm 124 carrying the ball 122 is either moved by the cam 120, or is permitted to move, depending upon the position which the eccentric portion 120 occupies and the direction of its movement. On this movement of the lever 124, movement of the levers 134 will result, and the cable 138 will either cause or permit the bell crank 144 to be moved, thereby varying the adjustment of the spring associated with the retardation control device 104.

It will be seen that upon this rotation of the handle element 117 to vary the adjustment of the retardation control device 104, the position of the shaft 110 is not altered, with the result that the condition of the application device 102 is not changed.

The control means 108 shown in Figs. 5 to 9 of the drawings is arranged to permit the handle to be quickly and easily removed and replaced when desired. On vehicles having control equipment at each end it is desirable to remove the handle at the end of the vehicle other than the one at which the operator is stationed in order to prevent unauthorized interference with the control of the vehicle brake equipment.

When it is desired to remove the handle, the locking ring 130 is moved against the spring 132, and when it has passed beyond the ends of the portions 146 of the levers 134, the lever 124 is no longer secured relative to the levers 134, and this lever is then moved about the pin 125 so that the ball 122 is raised away from the eccentric portion 120. The equipment is now substantially in the position in which it is shown in Fig. 7 of the drawings, and the handle assembly, including the handle element 117 and the member 112, may be lifted off from the end of the shaft 110 of the application device 102.

When it is desired to replace the handle assembly, the locking ring 130 is moved off from the portions 146 of the levers 134, and the end of the lever 124 is lifted to the position in which it is shown in Fig. 7 of the drawings, if it is not already in this position. The handle assembly may then be replaced, and as soon as it is replaced, the lever 124 is moved about pin 125 to bring the lever 124 substantially into alignment with the portions 146 of the levers 134, whereupon the spring 132 moves the locking ring 130 over the portions 146 of the levers 134 to again secure the lever 124 and the levers 134 together, while the ball 122 is moved into engagement with the surface of the eccentric portion 120.

In Figs. 10 and 11 of the drawings there is illustrated still another form of control means embodying this invention. As shown in these figures of the drawings, the application device 160 has a hollow shaft 162 movable about a substantially vertical axis for controlling the application device. The upper end of the shaft 162 terminates in a square end portion, indicated at 163, adapted to be received by a socket in a member 164 having formed integral therewith a shaft portion 165. The axis of the shaft portion 165 extends substantially perpendicular to the axis about which the shaft 162 moves, while the axes of the shaft 162 and of the shaft portion 165 substantially intersect.

A handle element 166 adapted to be grasped by the hand of an operator is mounted on the shaft portion 165 of the member 164, and is secured thereon by means of a washer 167, which engages an internal shoulder on the handle, while a nut 168 is secured on the end of the shaft portion 165 and is located within a recess in the end of the handle element.

The member 164 has a recess or cavity therein indicated at 170 in which is mounted a bell crank 172 having a hub portion which extends between the opposite walls of the cavity 170, as is best shown in Fig. 11 of the drawings. The hub portion of the bell crank 172 has a bore extending therethrough adapted to receive a pin 174 carried by the member 164 to pivotally support the bell crank.

One arm of the bell crank 172 has secured thereto substantially at a point intersected by the axis about which the shaft 162 moves, one end of a link 180 which is mounted in the opening through the hollow shaft 162. The other end of the link is connected by suitable means to mechanism for adjusting the spring associated with a retardation control device, not shown.

The other arm of the bell crank 172 is adapted to engage a notched cam face, indicated at 182, formed on the end of the handle element 166. The bell crank 172 is yieldingly held against the cam face 182 by force exerted through the link 180 by means associated with the retardation control device.

In the operation of this equipment, when it is desired to effect an application of the brakes by operation of the application device 160, the handle element 166 is moved in a horizontal plane and causes the shaft 162 to move about a vertical axis, thereby effecting control of the application device to produce an application of the brakes.

As the link 180 is connected with the bell crank 172 substantially at a point intersected by the axis about which the shaft 162 moves, the position of the link 180 will not be altered on this movement of the handle element 166 and of the shaft 162 to effect operation of the application device 160.

If it is desired to vary the adjustment of the retardation control device, not shown, the handle element 166 is turned about the shaft portion 165 of the member 164. On this turning movement of the handle element 166 the cam face 182 on the end of the handle element either moves or permits the bell crank 172 to be moved, and this movement of the bell crank is transmitted through the link 180 to the mechanism for adjusting the retardation control device.

The cam surface on the end of the handle element 166 being interrupted, or in the form of notches, as is best shown in Fig. 11 of the drawings, operates to maintain the handle element in the position to which it has been moved, and to prevent unintended movement thereof. The cam surface 182 is arranged, however, so that the handle element 166 can be readily moved when desired to effect a change in the adjustment of the retardation control device.

The control means shown in this figure of the drawings is arranged so that it may be detached and replaced when desired. If it is desired to remove the handle element, the end of the link 180 is disconnected from the arm of the bell crank 172, and the assembly, including the handle element 166 and the member 164, may thereupon be lifted from the end portion 163 of the shaft 162.

When it is desired to replace the handle element, it is positioned on the end portion 163 of the shaft 162, and the end of the link 180 is connected on the end of the bell crank 172, and the equipment is again ready for operation.

In Figs. 12 and 13 of the drawings, there is illustrated a somewhat different form of control means embodying this invention. This form of control means is similar to that shown in Figs. 10 and 11 of the drawings, and has an application portion indicated generally by the reference numeral 185, and including a hollow shaft 186 movable about a substantially vertical axis, and provided with a square end portion, indicated at 187, adapted to be received by a socket formed in a member 190. The member 190 has formed integral therewith a shaft portion 192, the axis of which extends substantially perpendicular to the axis about which the shaft 186 moves, while these axes are arranged to substantially intersect.

A handle element 193 is mounted on the shaft portion 192, and is secured thereon by means of a washer 194, which engages an internal shoulder on the handle element, while this washer is secured on the shaft portion 192 by means of a nut 195 positioned in a recess in the end of the handle element.

The member 190 has a cavity or recess 196 formed therein, while a lever 197 is positioned in this cavity and is pivotally supported on a pin 198 extending between the opposite walls of the cavity. One end of the lever 197 has secured thereto one end of a link 200, the point of connection between the link and the lever 197 being substantially intersected by the axis about which the shaft 186 moves. The link 200 extends through the hollow shaft 186, and is connected to means for adjusting the retardation control device employed in the brake equipment.

The other end of the lever 197 has mounted thereon a roller 202 adapted to engage an interrupted internal cam surface, indicated at 205, formed on the end of the handle element 193. The cam surface 205 comprises a series of notches or recesses, each of a size adapted to receive the roller 202, but spaced different distances from the axis of the shaft portion 192 about which the handle element 193 is moved.

The roller 202 is yieldingly held against the cam surface 205 by force exerted through the link 200 by means associated with the retardation control device.

In the operation of the brake equipment employing this form of control means, when it is desired to effect an application of the brakes, the handle element 193 is moved in a horizontal plane, and causes the shaft 186 to be moved about its axis, thereby actuating the application device 185 to produce an application of the brakes.

On this movement of the handle element 193 the lever 197 is moved in a horizontal plane, but because the point of connection between the lever 197 and the link 200 is substantially at the axis of the shaft 186, no change in the adjustment of the retardation control device will be produced.

If it is desired to effect a change in the adjustment in the retardation control device, the handle element 193 is turned about the shaft portion 192 of the member 190, and on this movement of the handle element, the cam surface 205 is moved across the roller 202, and either causes the lever 197 to be moved, or permits it to move, thereby effecting movement of the link 200, and causing the adjustment of the retardation control device to be varied.

As the cam surface 205 is interrupted, or consists of a series of notches, movement of the handle element 193 is yieldingly opposed, thereby preventing unintended movement of this handle element, and accordingly, tending to cause the handle element to be maintained in the position to which it has been moved. However, the resistance to movement of the handle element is not so great as to prevent movement thereof when it is desired to change the adjustment of the retardation control device.

The control means shown in this figure of the drawings may be detached from the application device when desired. In order to detach the control means, the end of the link 200 is detached from the end of the lever 197, and the control assembly, comprising the handle element 193 and the member 190, may then be lifted from the square end portion 187 of the shaft 186. When it is desired to replace the assembly, the handle element 193 and the member 190 are placed upon the square end portion 187 of the shaft 186, and the link 200 is then connected to the end of the lever 197.

While several embodiments of the improved vehicle brake equipment provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a vehicle brake equipment, in combination, braking means, an application device for effecting an application of said braking means, a control device responsive to an operating condition of said vehicle for regulating the degree of application of said braking means by said application device, a member movable about an axis for controlling one of said devices, an element carried by said member and movable relative thereto, said element having a cam surface associated therewith, and means engageable with said cam surface substantially at a point intersected by said axis for controlling the other of the said devices.

2. In a vehicle brake equipment, in combination, braking means, an application device for effecting an application of said braking means, a control device responsive to an operating condition of the vehicle for regulating the degree of application of said braking means, a member movable about an axis for controlling one of said devices, an element carried by said member, said element being adapted to be gripped by the hand of an operator for moving said member and being movable relative to said member, means operated by movement of said element relative to said member for controlling the other of the said devices, and means carried by said member and yieldingly opposing movement of said element relative to said member.

3. In a vehicle brake equipment, in combination, braking means, an application device for effecting an application of said braking means, a control device responsive to an operating condition of the vehicle for regulating the degree of application of said braking means, one of said devices having an actuating member movable about an axis for controlling said device, a control member detachably secured on said actuating member for moving said actuating member, an element carried by said control member and movable relative thereto, and means detachably connected to said element and operated by movement of said element relative to said control member for regulating said other device, said means being adapted to be disconnected from said element to permit said control member to be detached from said actuating member.

4. In a vehicle brake equipment, in combination, braking means, an application device for effecting an application of said braking means, a control device responsive to an operating condition of the vehicle for regulating the degree of application of said braking means, one of said devices having an actuating member movable about an axis for controlling said device, a control member detachably secured on said actuating member for moving said actuating member, an element carried by said control member and movable relative thereto, said element having a cam surface movable therewith, a lever having a portion connected to the other of said devices for regulating said device, said lever having another portion adapted to engage said cam surface, and means to detachably connect said lever portions together, said means being adapted to permit said lever portions to be moved relative to each other to permit said control member to be detached from said actuating member.

5. In a vehicle brake equipment, in combination, braking means, an application device for effecting an application of the braking means, a control device responsive to an operating condition of the vehicle for regulating the degree of application of said braking means, a member movable about an axis for controlling one of said devices, a cam carried by said member, means engageable with said cam and operated thereby for controlling the other of said devices, an element associated with said member and adapted to be gripped by the hand of an operator for moving said member about said axis, said element being movable relative to said member, and gears connecting said element and said cam for actuating said cam on movement of said element relative to said member.

6. In a vehicle brake equipment, in combination, braking means, an application device for effecting an application of said braking means, a control device responsive to an operating condition of the vehicle for regulating the degree of application of said braking means, a member movable about an axis for controlling one of said devices, an element associated with said member and adapted to be gripped by the hand of an operator for moving said member about said axis, said element being movable relative to said member, an interrupted cam surface associated with said element and movable therewith, and means yieldingly pressed into engagement with said cam surface for controlling the other of said devices.

7. In a vehicle fluid pressure brake equipment, in combination, application means operative on the supply of fluid under pressure thereto to effect an application of the brakes on the vehicle, a valve device for supplying fluid under pressure to said application means, control means for regulating the supply of fluid under pressure to said application means by said valve device, said control means comprising a movable member, a spring yieldingly opposing movement of said member, said member being moved against said spring in response to a reduction in the speed of the vehicle, a handle element movable about either of two axes and operable on movement about one of said axes to operate said valve device, and means operated by said handle element on movement about the other of said axes to vary the force exerted by said spring and opposing movement of said movable member.

8. In a vehicle fluid pressure brake equipment, in combination, application means operative on the supply of fluid under pressure thereto to effect an application of the brakes on the vehicle, a valve device for supplying fluid under pressure to said application means, valve means for regulating the supply of fluid under pressure to said application means by said valve device and for also releasing fluid under pressure from said application means, a movable member having a normal position and being operable on movement therefrom to control said valve means, a spring yieldingly opposing movement of said movable member, said member being movable away from said normal position against said spring in response to a reduction in the speed of the vehicle, a handle element movable about either of two axes, said handle element being operable on movement about one of said axes to control said valve device, and means operated by said handle element on movement thereof about the other of said axes to vary the force exerted by said spring and opposing movement of said movable member.

ELLIS E. HEWITT.